United States Patent
Yamaguchi et al.

(10) Patent No.: US 7,681,629 B2
(45) Date of Patent: Mar. 23, 2010

(54) EXHAUST GAS HEAT EXCHANGER

(75) Inventors: Hiroo Yamaguchi, Toyohashi (JP);
Tadaaki Yamaguchi, legal representative, Toyohashi (JP); Hideko Yamaguchi, legal representative, Toyohashi (JP); Yuuji Sako, Hazu-gun (JP); Kenshiro Muramatsu, Nishio (JP)

(73) Assignee: DENSO Corporation, Kariya (JP)

( * ) Notice: Subject to any disclaimer, the term of this patent is extended or adjusted under 35 U.S.C. 154(b) by 819 days.

(21) Appl. No.: 11/368,229

(22) Filed: Mar. 3, 2006

(65) Prior Publication Data

US 2006/0207245 A1    Sep. 21, 2006

(30) Foreign Application Priority Data

Mar. 7, 2005 (JP) ............................. 2005-062803
Feb. 7, 2006 (JP) ............................. 2006-029969

(51) Int. Cl.
*F28F 3/08* (2006.01)
*F28F 1/00* (2006.01)

(52) U.S. Cl. ........................................ 165/166; 165/167
(58) Field of Classification Search ............... 165/149, 165/151, 153, 158, 166, 167, 173
See application file for complete search history.

(56) References Cited

U.S. PATENT DOCUMENTS

| 2,068,236 | A | * | 1/1937 | Kuenstler | 165/130 |
| 2,616,671 | A | * | 11/1952 | Wakeman | 165/167 |
| 4,310,960 | A | * | 1/1982 | Parker | 29/890.039 |
| 4,327,802 | A | * | 5/1982 | Beldam | 165/153 |
| 5,327,958 | A | * | 7/1994 | Machata et al. | 165/167 |
| 6,220,340 | B1 | * | 4/2001 | Cheong et al. | 165/103 |
| 6,244,334 | B1 | * | 6/2001 | Wu et al. | 165/166 |
| 6,250,380 | B1 | * | 6/2001 | Strahle et al. | 165/167 |
| 6,293,337 | B1 | | 9/2001 | Strahle et al. | |
| 7,055,586 | B2 | * | 6/2006 | Sakakibara et al. | 165/158 |

* cited by examiner

*Primary Examiner*—Tho v Duong
(74) *Attorney, Agent, or Firm*—Harness, Dickey & Pierce, PLC

(57) ABSTRACT

A heat exchange core has a plurality of flat tubes laminated in a thickness direction, each flat tube defining an exhaust gas passage in which the exhaust gas flows. A plurality of coolant flow pass holes are formed in each of the flat tubes, wherein each of the coolant flow pass holes penetrates the flat tube in the thickness direction. The coolant flow pass holes of each flat tube are connected with the coolant flow pass holes of the other flat tubes, in order to respectively form a plurality of coolant flow passages through which liquid coolant flows, and the coolant flow pass holes of each coolant flow passages are communicated with each other in the laminated direction, so that the coolant flow passages are formed to be perpendicular to the exhaust gas passages.

12 Claims, 12 Drawing Sheets

FIG. 15A
⟨BEFORE BRAZING⟩
FIG. 15B
⟨AFTER BRAZING⟩
⟨WITHOUT SLIDE PLATE PORTION⟩
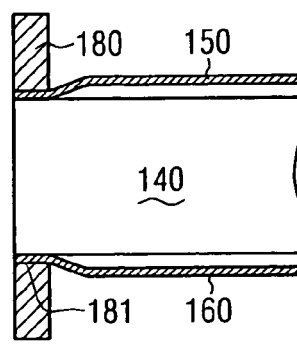
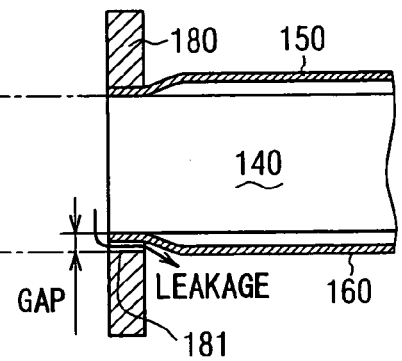
FIG. 15C
FIG. 15D
⟨WITH SLIDE PLATE PORTION⟩
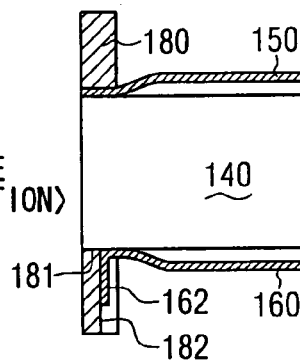
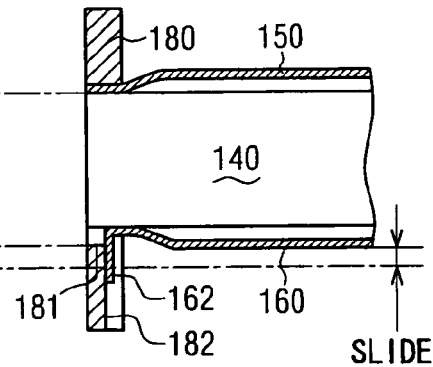

US 7,681,629 B2

EXHAUST GAS HEAT EXCHANGER

CROSS-REFERENCE TO RELATED APPLICATION

This application is based on Japanese Patent Applications Nos. 2005-062803 filed on Mar. 7, 2005, and 2006-29969 filed on Feb. 7, 2006, disclosures of which are incorporated herein by reference.

FIELD OF THE INVENTION

The present invention relates to an exhaust gas heat exchanging apparatus for exchanging heat between exhaust gas from a liquid-cooled internal combustion engine and liquid coolant.

BACKGROUND OF THE INVENTION

An exhaust gas heat exchanger for performing heat exchange between exhaust gas generated by a liquid cooled internal combustion engine and liquid coolant used for cooling the engine is well known, for example, as disclosed in Japanese Patent Publication No. 2000-97578. FIG. 16 is a schematic vertical cross sectional view showing an assembly configuration of the exhaust gas heat exchanger shown in the above Japanese Patent Publication. A heat exchange core 140 has a plurality of laminated tubes 130 forming exhaust gas passages 132, through which exhaust gas flows. A first tank member 155 having a first insertion opening 157 and a second tank member 156 having a plurality of second insertion openings 158 are sequentially assembled to end portions of the laminated tubes 130. Such an assembled unit is brazed to finish a heat exchanger body 170 having tank portions 152 formed at both sides of the laminated tubes 130.

Though a left tank portion is omitted in FIGS. 16 and 17, the left tank portion employs symmetrically the same configuration to the right tank portion. FIG. 17 is a partial cross sectional view explaining a flow path in the exhaust gas heat exchanger in FIG. 16. Exhaust gases which flow into the second tank member 156 are distributed to plural exhaust gas passages 132 and flow to the left side in the drawing. Cooling liquid which flows into the tank portions 152 through an inlet pipe 151 is distributed and delivered to coolant passages 131, which are formed between the tubes 130 by projections 133 provided at both edges of the tubes 130. The cooling liquid flows to the left side in the drawing, so that heat exchange is carried out with the exhaust gases flowing in parallel therewith.

The above conventional art, however, has a problem that efficiency of heat exchange can not be easily increased due to a parallel flow, in which exhaust gas flowing inside the tubes 130 and liquid coolant flowing outside the tubes 130 (between the tubes 130) flow in the same direction. It is another disadvantage in that the heat exchanger becomes longer in its size, because two tank portions 152 are necessary at both ends of the tubes 130 for distributing the coolant into and collecting the coolant from the multiple tubes.

A direction of assembling the tank members 155 and 156 at both ends of the tubes 130 is at a right angle to a direction of laminating the tubes 130. Accordingly, a problem of cost increase is unavoidable due to this difficult assembling. It is, furthermore, necessary to control a distance between the laminated tubes 130 as well as a distance between the multiple second insertion openings 158 to be formed at the second tank member 156, at an optimum amount, in order not to make in-process brazing defects, which might occur in a brazing process subsequent to assembling, at brazed portions between the tubes 130 and at brazed portions between the tubes 130 and the second insertion openings 158.

SUMMARY OF THE INVENTION

The present invention is made in view of the problems of the above conventional art, and an object of the present invention is to provide an improved exhaust gas heat exchanger. Another object of this invention is to make heat exchange efficiency much higher. A further object is to provide a compact-sized heat exchanger and to reduce manufacturing cost by adopting easy-to-assemble configuration in product designing.

According to a feature of the present invention, an exhaust gas heat exchanger (100) for a liquid cooled internal combustion engine (10), in which heat exchange between exhaust gas and liquid coolant is performed, comprises; a heat exchange core (140) having a plurality of flat tubes (130) laminated in a thickness direction, each flat tube (130) defining an exhaust gas passage (132) in which the exhaust gas flows; and a plurality of coolant flow pass holes (131a) formed in each of the flat tubes (130), each of the coolant flow pass holes (131a) penetrating the flat tube (130) in the thickness direction. The coolant flow pass holes (131a) of each flat tube (130) are connected with the coolant flow pass holes (131a) of the other flat tubes (130), in order to respectively form a plurality of coolant flow passages (131) through which liquid coolant flows, and the coolant flow pass holes (131a) of each coolant flow passages (131) are communicated with each other in the laminated direction, so that the coolant flow passages (131) are formed to be perpendicular to the exhaust gas passages (132).

According to the above feature, it is possible to improve heat exchange efficiency by arranging exhaust gas flow to be perpendicular to coolant flow.

According to another feature of the present invention, each of the flat tubes (130) is formed by a pair of first and second tube plates (110, 120), a plurality of holes (111) are formed in the first tube plate (110), a plurality of convex portions (121) are formed in the second tube plate (120), and each of the convex portions (121) has an opening at a top surface thereof. The hole (111) of the first tube plate (110) and the opening of the second tube plate (120) are connected with each other, when the first and second tube plates (110, 120) are laminated, to form the coolant flow pass hole (131a).

According to the above feature, it is easy to form the coolant flow pass holes (131a) which penetrate through each of empty insides of the flat tubes (130) in the thickness direction. Brazing performance can be improved by forming the holes (111) of the first tube plate (110) with burring portions and by enlarging the holes (111) after the burring portions (111) are assembled into the openings (121) formed on the top surface of the convex portions of the second tube plate (120).

According to a further feature of the present invention, the coolant flow passages (131) are arranged in a zigzag layout with respect to the exhaust gas passages (132). It is possible, with such feature, to further improve efficiency of heat exchange performed between exhaust gas flowing through the exhaust gas passages (132) and the coolant flowing through the coolant flow passages (131).

According to a still further feature of the present invention, the plurality of the flat tubes (130) are laminated in one direction to form the plurality of the exhaust gas passages (132) and the coolant flow passages (131).

According to such feature of the invention, the heat exchange core (140) has a structure of simple assembling of successive one-way lamination, so that assembling cost can be reduced. Furthermore, it is easy to re-work in-process brazing defects which might be caused on the surfaces of the heat exchange core.

According to a still further feature of the present invention, a tank plate (150) is laminated on a top end of the heat exchange core (140) in the laminated direction, to form an inlet side tank portion (152) for distributing the liquid coolant into a first group of the plurality of coolant flow passages (131), and to form an outlet side tank portion (153) for collecting the liquid coolant from a second group of the plurality of coolant flow passages (131). Another tank plate (160) is likewise laminated on a bottom end of the heat exchange core (140) in the laminated direction to form a tank portion (161) for collecting the liquid coolant from the first group of the coolant flow passages (131) and for distributing the collected coolant into the second group of the coolant flow passages (131).

According to such feature of the invention, the heat exchanger (100) likewise has a structure of simple assembling of successive one-way lamination to complete the assembled unit for the heat exchanger, so that assembling cost can be reduced. And it is also easy to re-work in-process brazing defects which might be caused on the surfaces of the tank portions.

According to a still further feature of the present invention, the tube plates (110, 120) for the flat tubes (130) as well as tank plates (150, 160) are made of metal sheets clad with brazing material on its one surface or on both surfaces.

According to such feature of the invention, manufacturing cost can be reduced as a result of eliminating a process for brazing filler coating, and improving yield ratio of brazing material.

According to a still further feature of the present invention, both ends of the exhaust gas passages (132) formed in the heat exchange core (140) are inserted into respective core-support openings (181) of a pair of flanges (180), so that outer peripheral portions of the both ends are brazed to the flanges (180). Slide plane portions (162) are further provided at longitudinal ends of one of the tank plates (150, 160), so that the slide plane portions (162) face to and are in contact with inside surfaces (182) of the flanges (180) and the slide plane portions (162) are movable in the laminated direction before the tank plates (150, 160) are brazed to the heat exchange core (140).

According to the above feature of the invention, leakage of exhaust gas can be prevented by covering, with the slide plane portions (162), a gap which might be made between the heat exchange core (140) and the core-support openings (181) as a result of shrinkage of the heat exchange core (140).

According to a still further feature of the present invention, an exhaust gas heat exchanger provided in an exhaust pipe (11) of a liquid cooled engine (10), in which heat exchange between exhaust gas and liquid coolant is performed, comprises; a first tube plate (110) having a first group of communication holes (111); and a second tube plate (120) having a second group of communication holes (121), wherein the first and second tube plates (110, 120) are alternately laminated to form exhaust gas passages (132) between the first and second tube plates (110, 120). The first and second groups of the communication holes (111, 121) are communicated with each other to form coolant flow passages (131) in a direction in which the first and second tube plates (110, 120) are laminated, wherein the coolant flow passages (131) are separated from the exhaust gas passages (132). A heat exchange core (140) is formed by the first and second tube plates (110, 120), wherein the exhaust gas passages (132) are opened at both longitudinal ends thereof. And the heat exchange core (140) is provided with a pair of flanges (180) having core-support openings (181), into which both longitudinal ends of the heat exchange core (140) are inserted, and outer peripheral portions of the both ends are brazed to the flanges (180).

According to the above feature of the invention, only the exhaust gas passages (132) are opened at the longitudinal ends thereof in the direction of exhaust gas flow, and therefore it is sufficient to connect by brazing only peripheral portions of the heat exchange core (140) with the flanges (180). This makes it possible to reduce areas that should be connected between the flanges (180) and the heat exchange core (140) in comparison with the conventional exhaust gas heat exchanger.

Furthermore, it is not necessary to respectively insert the first and second plates (110,120) into the flanges (180), but sufficient to simply insert the heat exchange core (140) as one unit into the flanges (180).

BRIEF DESCRIPTION OF THE DRAWINGS

The above and other objects, features and advantages of the present invention will become more apparent from the following detailed description made with reference to the accompanying drawings. In the drawings:

FIGS. 15A and 15B are cross sectional views of an exhaust gas heat exchanger having no slide plate portion, before and after brazing;

FIGS. 15C and 15D are cross sectional views of an exhaust gas heat exchanger 100 having a slide plate portion, before and after brazing, according to the second embodiment;

DETAILED DESCRIPTION OF PREFERRED EMBODIMENTS

First Embodiment

Figure 1:
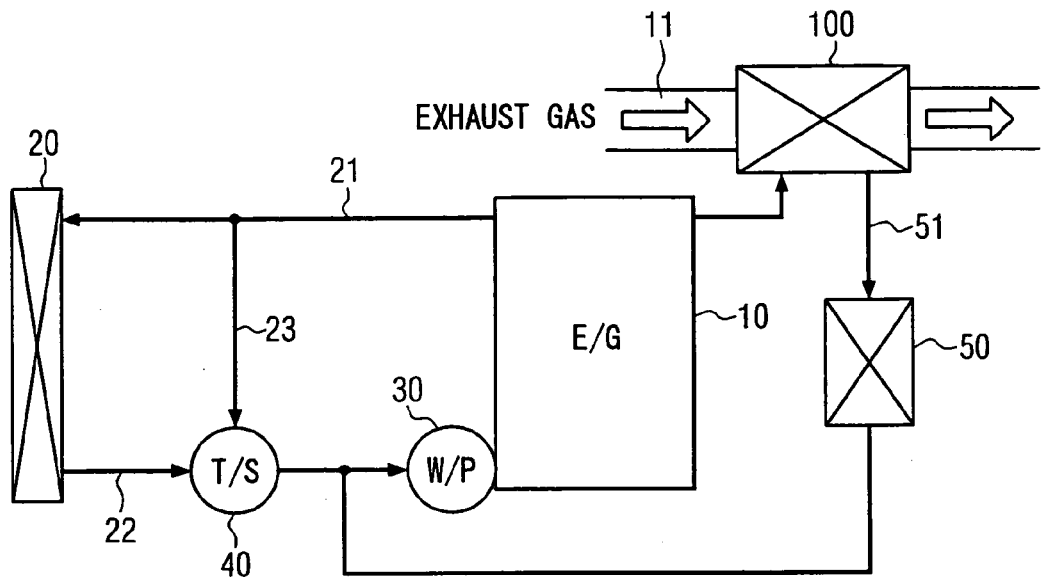
FIG. 1 is a schematic diagram showing a system structure of a heat exchanging apparatus for a liquid cooled internal combustion engine according to an embodiment of the present invention.

Embodiments of the present invention will be disclosed hereinafter with reference to the accompanying drawings. FIG. 1 is a schematic diagram showing a system structure of a heat exchanging apparatus for a liquid-cooled internal combustion engine. A water-cooled gasoline engine 10 used for an automotive vehicle (referred to as an engine hereinafter), as one of liquid-cooled internal combustion engines, is connected with a radiator 20 by way of an inlet pass 21 and a return pass 22, wherein the radiator carries out heat exchange between coolant (engine cooling water) for cooling the engine 10 and surrounding air.

More specifically, one side (upstream side) of the inlet pass 21 is connected with a cylinder head of the engine 10, and the other side (downstream side) thereof is connected with an inlet port of the radiator 20. One side (upstream side) of the return pass 22 is connected with an outlet port of the radiator 20, and the other side (downstream side) thereof is connected with a cylinder block of the engine 10.

The coolant, which becomes relatively higher in temperature as a result of cooling the engine 10, flows into the radiator 20 through the inlet pass 21 and is changed to coolant of relatively low temperature through heat exchange. The low temperature coolant is circulated by a water pump 30 into the engine 10 through the return pass 22 and then flows from the cylinder block to the cylinder head through inside a water jacket (not shown) incorporated therein for cooling the engine 10.

The water pump 30, which is a mechanical pump for circulating the coolant between the engine 10 and the radiator 20, is provided in a midstream of the return pass 22 and driven by a drive belt connected with the engine 10. The coolant supplied by the water pump 30 to the cylinder block, after flowing inside the cylinder block, flows into the side of the cylinder head through holes of a gasket (not shown) disposed therebetween.

One end of a bypass 23 is connected with the return pass 22 at the upstream side of the water pump 30, and the other end of the bypass 23 is connected with the inlet pass 21 so that the coolant flowing in the inlet pass 21 can be detoured without heading toward the radiator 20. A well known wax type thermostat 40 is provided at a juncture, where the bypass 23 and the return pass 22 are connected, as a means for controlling coolant temperature.

The thermostat 40 controls opening and closing of a valve by expansion or shrinkage of wax filled in a valve portion of the thermostat 40, such expansion or shrinkage being caused by the change of coolant temperature. The bypass 23 is opened when the temperature of coolant flowing into the bypass 23 through the inlet pass 21 is lower than a prescribed value, and is closed when the temperature is higher than the prescribed value so that all quantity of the coolant in the inlet pass 21 can flow into the radiator 20.

A radiator fan (not shown) for drawing air is installed at a back side of the radiator 20, i.e. a downstream side of air flow. The radiator fan is driven by an electrical motor controlled by an engine control unit (not shown).

An operation of the above embodiment will be explained below. Upon start of the engine 10, the water pump 30 is revolved by the engine driving force. The coolant is then drawn and introduced into the engine 10 by the revolutions of the water pump 30. The coolant, which is heated as a result of cooling the engine 10 during its circulation inside the engine 10, flows into the radiator 20 through the inlet pass 21. In the radiator 20, heat exchange is performed between the high temperature coolant and outside air so that relatively low temperature coolant can be obtained.

The low temperature coolant is drawn into the water pump 30 through the return pass 22. When the coolant temperature is below the prescribed value, e.g. 80 degrees centigrade, for example shortly after the engine 10 has been started, the thermostat 40 is controlled to make the bypass 23 opened and thus the coolant passing through the inlet pass 21 flows into the bypass 23 to bypass the radiator 20.

The thermostat 40 starts closing the bypass 23 when the coolant temperature exceeds approximately 80 degrees C., and shuts the passage of the bypass 23 around 90 degrees C. However, in the case that an electrically driven valve or the like is used instead of the thermostat 40, the above prescribed value can be flexibly changed according to driving conditions such as outside air temperature.

A coolant circulating pass 51, which is different from the passes provided at the side of the radiator 20, is connected with the cylinder head of the engine 10. An exhaust gas heat exchanger 100 of the present invention (described below) is installed at the upstream of the coolant circulating pass 51, and a heater core 50 is mounted at the downstream thereof. The downstream end of the coolant circulating pass 51 is connected with the return pass 22 at a juncture between the thermostat 40 and the water pump 30, so that the coolant can be circulated by the operation of the water pump 30 to the exhaust gas heat exchanger 100 and the heater core 50 as well.

The heater core 50 is a heat exchanger for warming a vehicle indoor room by heat exchange between heated coolant and air to be air-conditioned. The exhaust gas heat exchanger 100, which is mounted inside a muffler (an exhaust pipe) 11, is an apparatus for facilitating the heating operation for the coolant at cold start of the engine 10 by use of the heat of exhaust gas, thereby enhancing heating performance and fuel consumption efficiency. More specifically, the coolant flowing out of the engine 10 at start-up gets warmer by exchanging heat with the exhaust gas passing through the exhaust gas heat exchanger 100 and the heated coolant is returned to the engine 10, being drawn by the water pump 30, after passing inside heater core 50.

Figure 2:
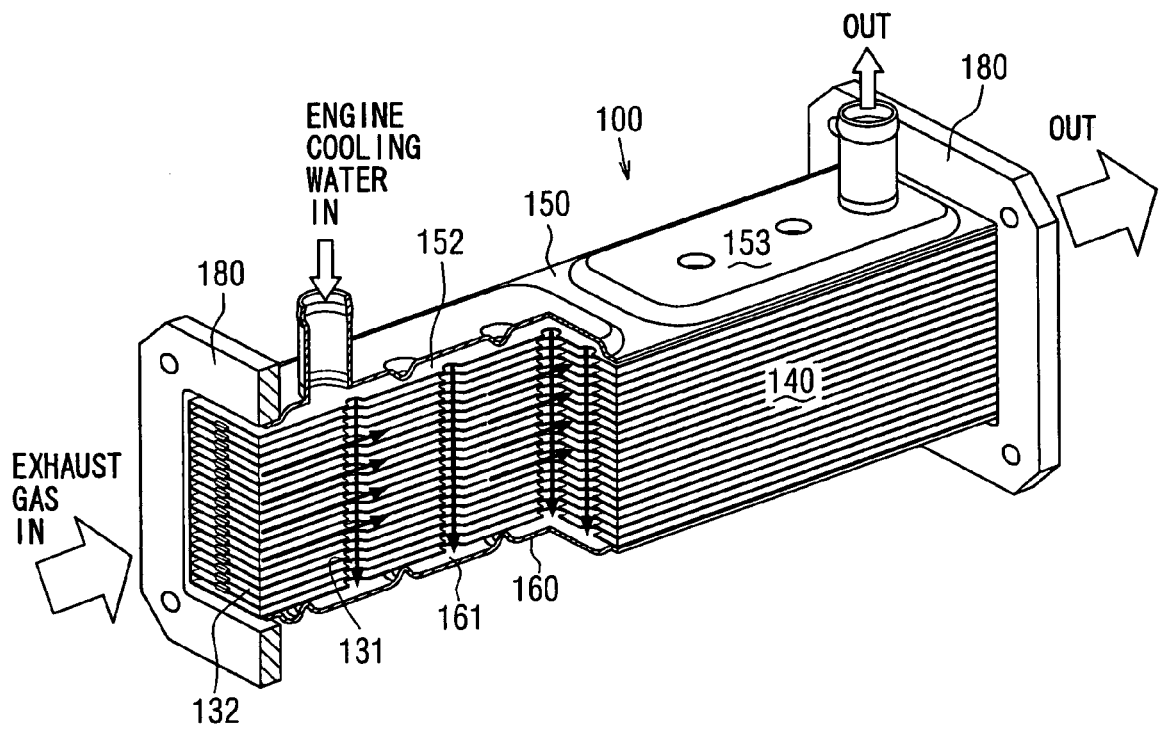
FIG. 2 is an oblique view showing a partial cross section of an exhaust gas heat exchanger according to a first embodiment of the present invention.
Figure 3:
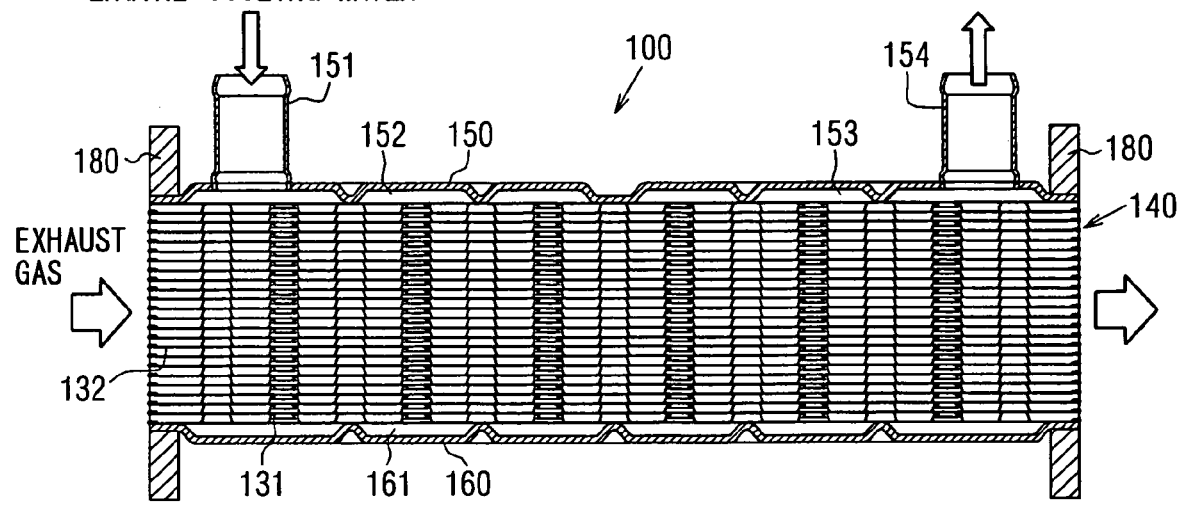
FIG. 3 is a vertical cross sectional view of the exhaust gas heat exchanger of FIG. 2.
Figure 4A:
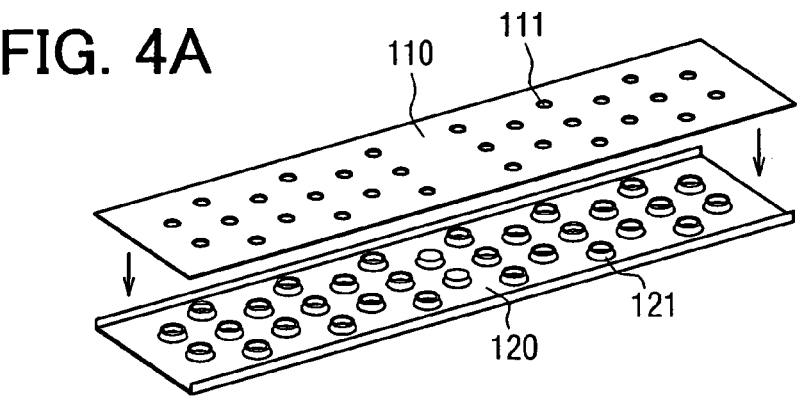
FIGS. 4A and 4B are oblique views of a tube 130 before and after assembling, according to the first embodiment.
Figure 4B:
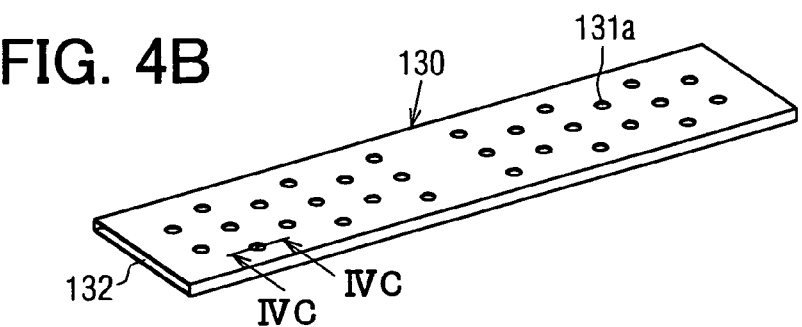
Figure 4C:
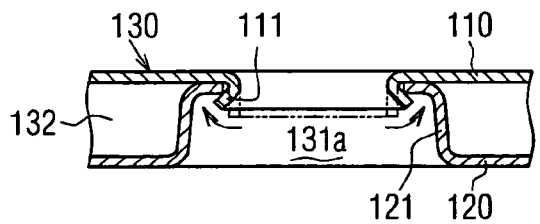
FIG. 4C is an enlarged cross sectional view taken along a line IVC-IVC in FIG. 4B.

A structure of the exhaust gas heat exchanger 100 will be described together with manufacturing processes thereof with reference to FIGS. 2 to 7. FIG. 2 is an oblique view of a partial cross section of the exhaust gas heat exchanger 100 according to a first embodiment of the present invention. FIG. 3 is a vertical cross sectional view of the exhaust gas heat exchanger 100 of FIG. 2. FIG. 4A is an oblique view of a tube 130 before assembling, according to the embodiment of the present invention. FIG. 4B is an oblique view of the tube after assembling. FIG. 4C is an enlarged cross sectional view of a caulked portion, taken along a line IVC-IVC of FIG. 4B.

The exhaust gas heat exchanger 100 is provided with a heat exchange core 140 having a plurality of flat tubes 130 laminated in a thickness direction to form exhaust gas passages 132, through which exhaust gas flows. Each of the laminated flat tubes 130 has a plurality of coolant flow pass holes 131a which penetrate through the tubes 130 in the laminated direction. The respective coolant flow pass holes 131a are connected with those of the other laminated tubes, so that the coolant flow pass holes are communicated in the laminated direction in the heat exchange core 140. Plural coolant flow passages 131 are thereby formed, in which the coolant flows in a direction perpendicular to the exhaust gas passages 132.

Each of the flat tubes 130 comprises a pair of (first and second) tube plates 110 and 120. The first tube plate 110 has burring portions (burring holes) 111, which constitute one side of the coolant flow pass holes 131a and are disposed in a zigzag layout. The second tube plate 120 has convex projections 121 which are likewise formed in the zigzag layout corresponding to the burring holes 111. Each of the convex projections 121 has an opening at a top surface thereof, so that the burring portions 111 can be inserted into the respective openings. The pair of tube plates 110 and 120 are lapped and jointly caulked by enlarging a forward end of the burring portion 111, as shown in FIG. 4C, to form the coolant flow pass hole 131a.

Figure 5A:
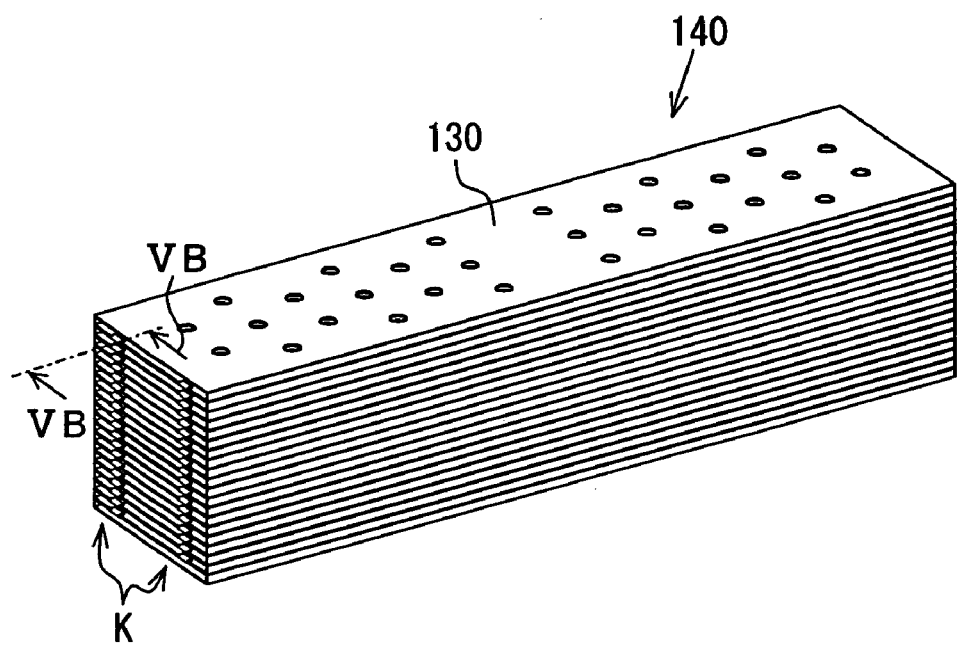
FIG. 5A is an oblique view of a heat exchange core 140 according to the first embodiment.
Figure 5B:
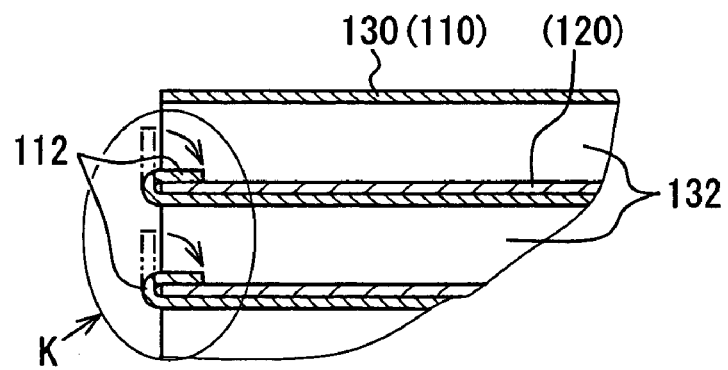
FIG. 5B is an enlarged cross sectional view taken along a line VB-VB in FIG. 5A.

FIG. 5A shows an oblique view of the heat exchange core 140 according to the embodiment of the present invention, and FIG. 5B is an enlarged cross sectional view of caulking portions K, taken along a line VB-VB in FIG. 5A. The heat exchange core 140 is comprised of a plurality of the flat tubes 130 laminated in the thickness direction. As already explained above, when the flat tubes 130 are laminated, the coolant flow pass holes 131a are communicated with each other in the laminated direction to form the coolant flow passes 131, which are perpendicular to the exhaust gas passages 132. The laminated flat tubes 130 are pre-assembled to one another with caulking hooks 112 formed at opening ends of the exhaust gas passages 132, as shown in FIG. 5B.

Figure 6A:
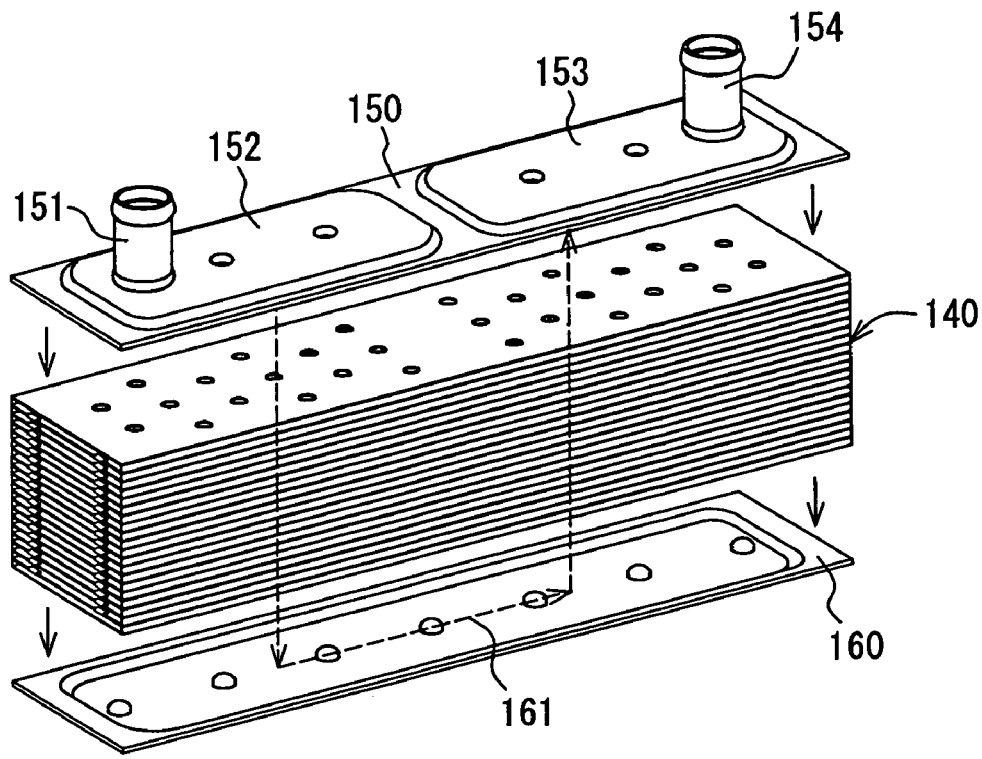
FIGS. 6A and 6B are oblique views of a heat exchanger body 170 before and after assembling, according to the first embodiment.
Figure 6B:
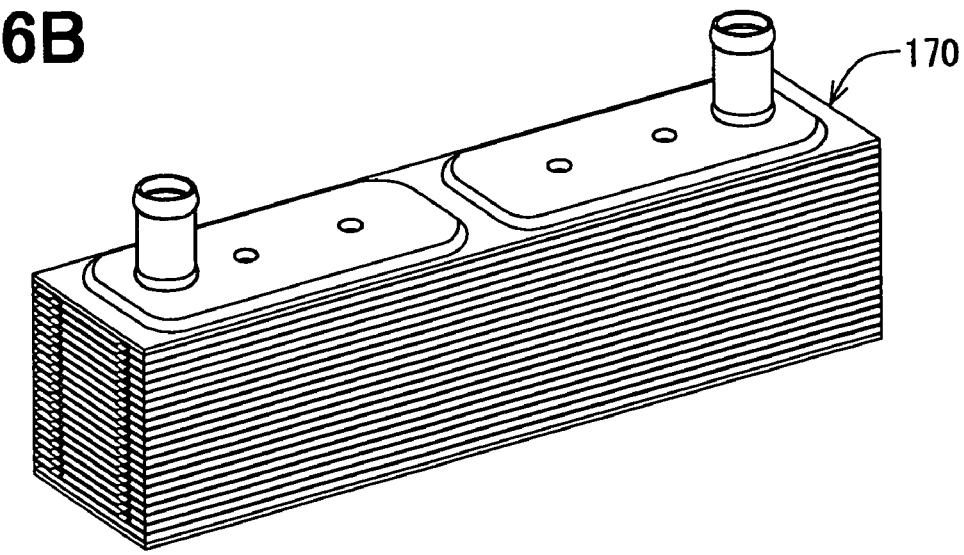

FIGS. 6A and 6B are oblique views of a heat exchanger body 170 according to the first embodiment of the present invention, wherein FIG. 6A shows a state before assembling tank plates 150 and 160, and FIG. 6B shows a state after assembling the same. The tank plates 150 and 160 are laminated on the top and bottom ends of the heat exchange core 140 in the laminated direction to form tank portions 152, 153 and 161. More specifically, the flow-in tank (inlet side tank portion) 152 is a tank portion for distributing the coolant which flows from an inlet pipe 151 to a first group of the coolant flow passages 131 (a left-hand side half portion of the coolant flow passages).

The return tank 161 is a tank portion for collectively recovering the coolant which is distributed by the flow-in tank 152 and passes through the first group of the coolant flow passages 131 of the heat exchange core 140, for conveying the recovered coolant to a second group of the coolant flow passages (a right-hand side half portion), and further for distributing the recovered coolant to the second group of the coolant flow passages 131. The flow-out tank (outlet side tank portion) 153 is a tank portion for collectively recovering the coolant which is distributed by the return tank 161 and passes through the second group of the coolant flow passages 131 and for leading the recovered coolant towards an outlet pipe 154.

Figure 7A:
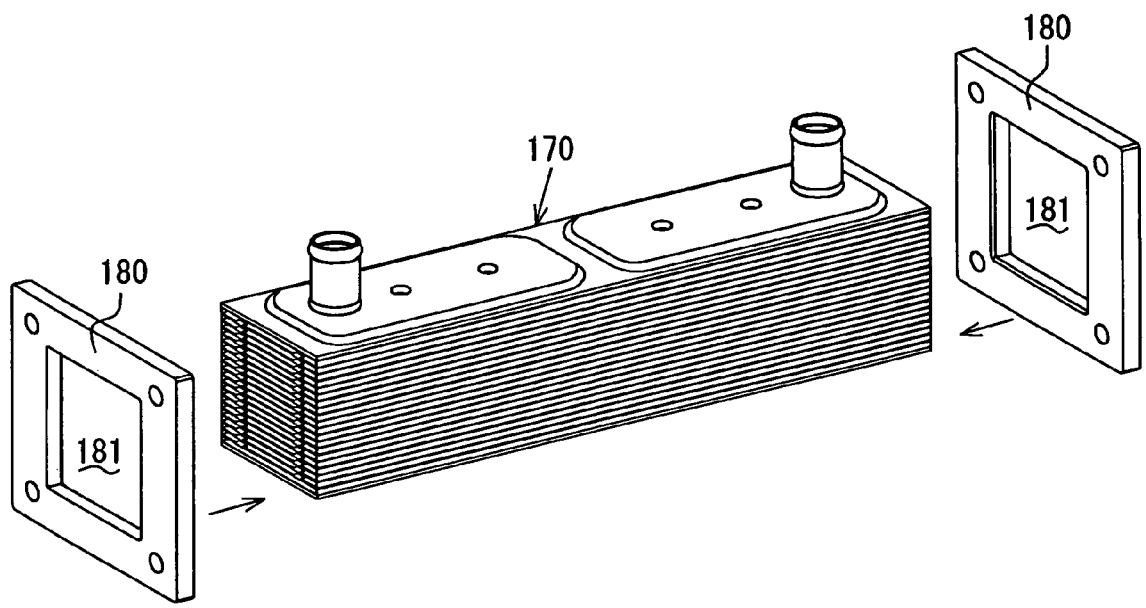
FIGS. 7A and 7B are oblique views of an exhaust gas heat exchanger 100 before and after assembling, according to the first embodiment.
Figure 7B:
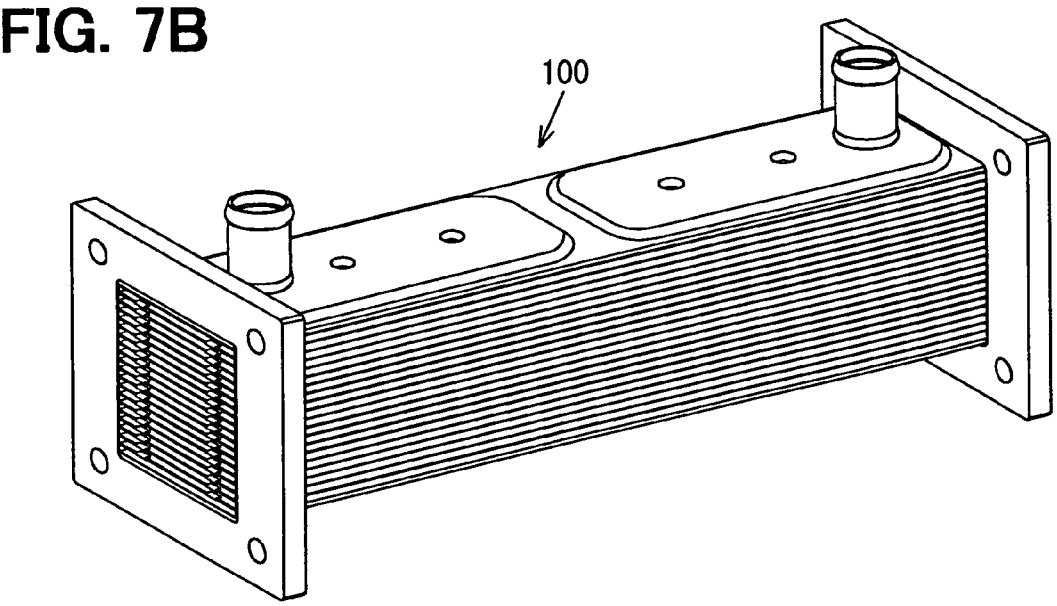

FIGS. 7A and 7B are oblique views of the exhaust gas heat exchanger 100 according to the first embodiment of the present invention, wherein FIG. 7A shows a state before assembling flanges 180, and FIG. 7B shows a state after assembling the same. At a final stage, the heat exchanger body 170 is loaded into a brazing furnace in a state of sub-assembly in which both ends of the exhaust gas passages 132 are respectively inserted into core-support openings 181 of the flanges 180. The sub-assembly is unitarily brazed in the brazing furnace to finish the exhaust gas heat exchanger 100, wherein brazed contacts are respectively created between the laminated flat tubes 130, between the flat tubes 130 and the tank palates 150, 160 and further between the outer periphery of the heat exchanger body 170 and the flanges 180.

The exhaust gas heat exchanger 100 comprises the parts of superior anti-corrosive material (metal sheets), such as stainless steel or the like, wherein brazing material is clad on one of surfaces or on both surfaces of the tube plates 110, 120 constituting the flat tubes 130 and plates for the tank plates 150, 160.

The features and advantages of this embodiment will be described below. Firstly the heat exchange core 140 is formed by a plurality of the flat tubes 130 laminated in the thickness direction, wherein the flat tubes are used as the exhaust gas passages 132 in which exhaust gases flow. Each of the laminated flat tubes 130 has a plurality of the coolant flow pass holes 131a which penetrate through the flat tubes in the laminated direction. The coolant flow pass holes 131a are connected with each other in the laminated direction by lamination structure of the heat exchange core 140, to form a plurality of the coolant flow passages 132 in which the coolant flows. The coolant flow passages 131 are arranged to be perpendicular to the exhaust gas passages 132. With this feature, it is possible to improve heat exchange efficiency by intersection of the exhaust gas flow and the coolant flow at right angles.

The flat tube 130 is made by brazing two tube plates 110 and 120, wherein the coolant flow pass holes 131a are made by brazing the openings of the convex projections 121 formed on the tube plate 120 with the burring portions 111 formed on the other tube plate to achieve the continuous coolant flow therebetween. With this construction, it is easy, to form the coolant flow pass holes 131a which can pass through the flat tubes 130 of the empty hollow shape in the thickness direction. Further, the brazing workability can be improved by enlarging the peripheral portions of the burring holes 111 of the tube plate 110, after the burring portions are inserted into the openings of the convex projections 121, and caulked therewith.

The coolant flow passages 131 are arranged in the zigzag layout against the exhaust gas passages 132, thus improving the efficiency of heat exchange performed between the exhaust gas flowing through the exhaust gas passages 132 and the coolant flowing through the coolant flow passages 131. Furthermore, the heat exchange core 140 is made by a plurality of the flat tubes 130 laminated in one direction to form plural exhaust gas passages 132 and plural coolant flow passages 131 therein. With this construction, the heat exchange core 140 can be simply assembled by virtue of one-way lamination to reduce assembling cost, and also can be reworked easily even in case in-process poor brazing is caused on the surfaces of the heat exchange core 140.

The tank portions 152, 153 and 161, for distributing the coolant into the multiple coolant flow passages 131 and/or for collecting the coolant from such passages 131, are formed by additional lamination of the tank plates 150, 160 onto both ends of the heat exchange core 140. With this construction, non-stop assembling of one-way lamination is applicable up to the assembling process of the heat exchanger body 170, thus reducing assembling cost. Also re-working can be made effortless even if in-process poor brazing takes place on the surfaces of such tank portions.

As for the plate material for the tube plates 110, 120 constituting the flat tubes 130 and the tank plates 150, 160, the metal sheets clad with the brazing material on its one surface or both surfaces are used. This feature helps reduce manufacturing cost as a result of removing a work of brazing filler coating, improving brazing yield and so on.

(First Modification)

Figure 8A:
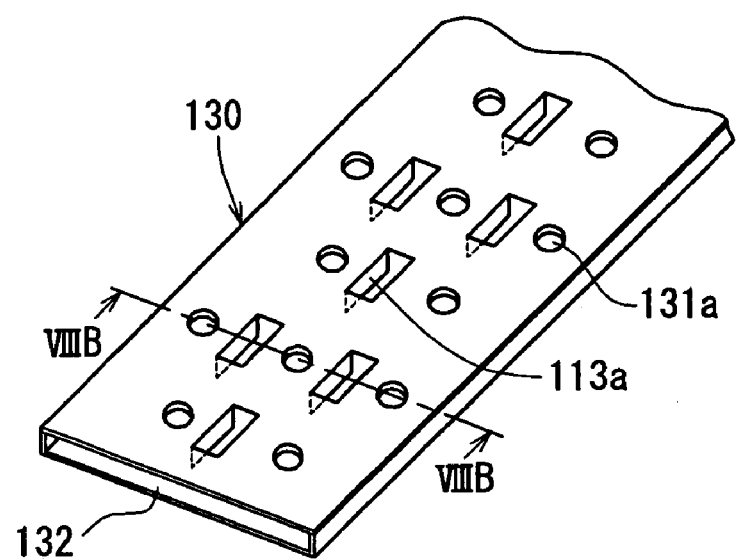
FIG. 8A is an oblique view of a tube 130 according to a modification of the first embodiment.
Figure 8B:
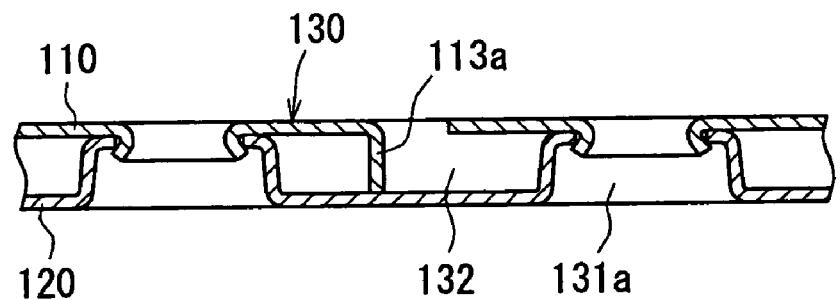
FIG. 8B is a cross sectional view taken along a line VIIIB-VIIIB in FIG. 8A.

FIG. 8A is an oblique view of a first modification of the tube 130, and FIG. 8B is a cross sectional view taken along a line VIIIB-VIIIB in FIG. 8A. This modification differs from the first embodiment in that multiple rectangular projections (fins) 113a are formed in the tube plate 110, as shown in FIGS. 8A and 8B. With such a structure, a heat receiving area for receiving heat from the exhaust gas is increased, so that heat exchange efficiency (heating of the coolant, and cooling of the exhaust gas) between the coolant and the exhaust gas can be improved.

Since the rectangular projections 113a are integrally formed in the tube plate 110, a number of parts is not increased to thereby suppress the cost increase. The rectangular projections 113a are formed by cutting and bending respective portions of the sheet material for the tube plate 110, wherein the portions are located between the coolant flow pass holes 131a and the rectangular projections 113 are bent in the same direction to the burring holes 111.

(Second Modification)

Figure 9:
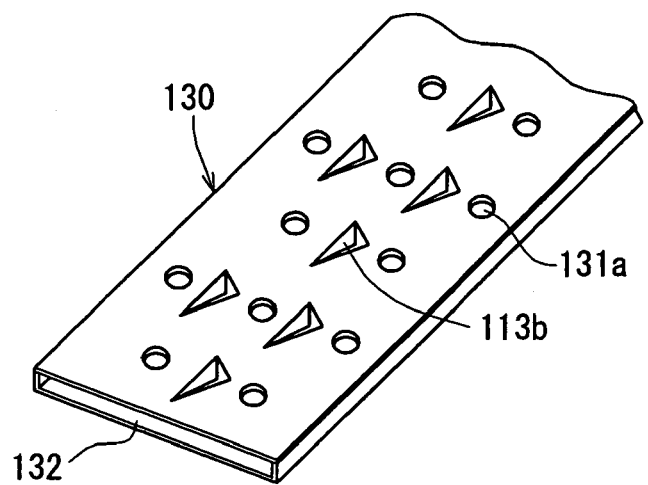
FIG. 9 is an oblique view of a tube 130 according to another modification of the first embodiment.

FIG. 9 is an oblique view of a second modification of the tube 130, which differs from the first modification in that multiple triangular projections (fins) 113b are formed in the tube plate 110. With such a structure, soot is prevented from piling up at fin portions (projections 113b) in addition to the increase of the heat exchange efficiency.

(Third Modification)

Figure 10A:
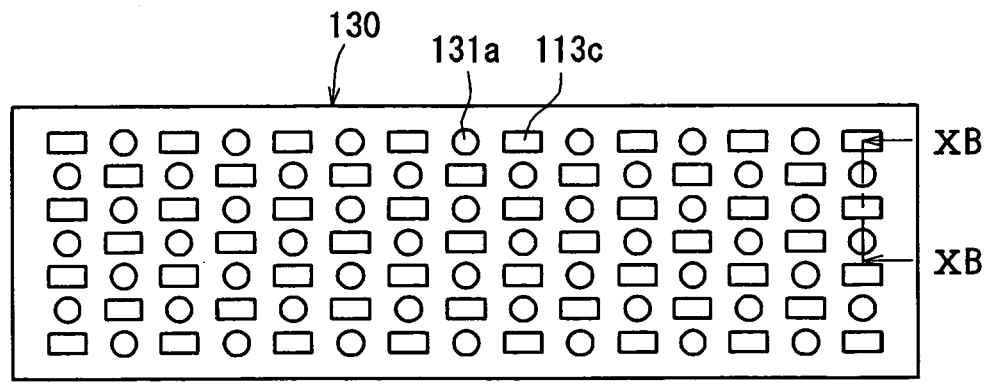
FIG. 10A is a top plan view of a tube 130 according to a further modification of the first embodiment.
Figure 10B:
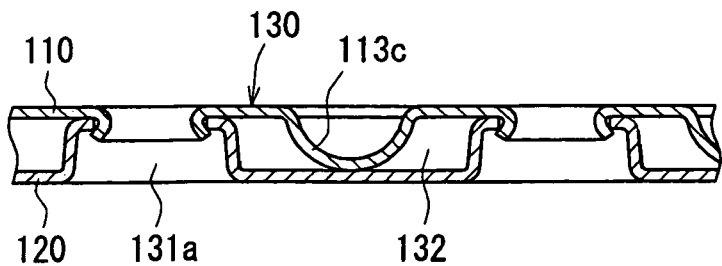
FIG. 10B is a cross sectional view taken along a line XB-XB in FIG. 10A.

FIG. 10A is a top plan view of a third modification of the tube 130, and FIG. 10B is a cross sectional view taken along a line XB-XB in FIG. 10A. Multiple fins 113c may be formed by punching out the respective portions of the sheet material for the tube plate 110, as shown in the drawing. The fins 113c may be formed in the tube plate 120, or in both of the tube plates 110 and 120. A projected forward end of each fin 113c is preferably brought into contact with other tube plate 110 or 120 in view of the heat transmission. However, the projected forward end is not necessarily in contact with the other plate.

Second Embodiment

Figure 11A:
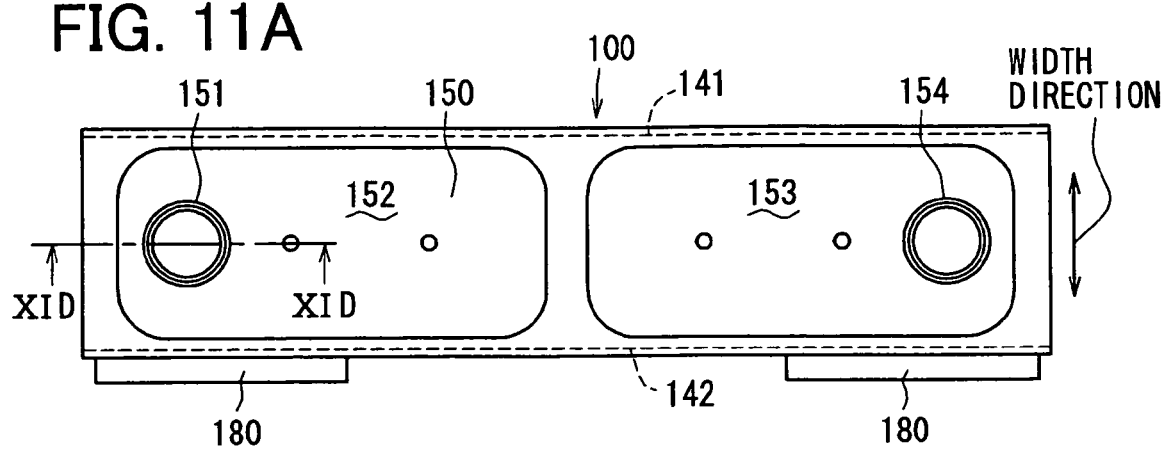
FIG. 11A is a top plan view of an exhaust gas heat exchanger 100 according to a second embodiment of the present invention.
Figure 11B:
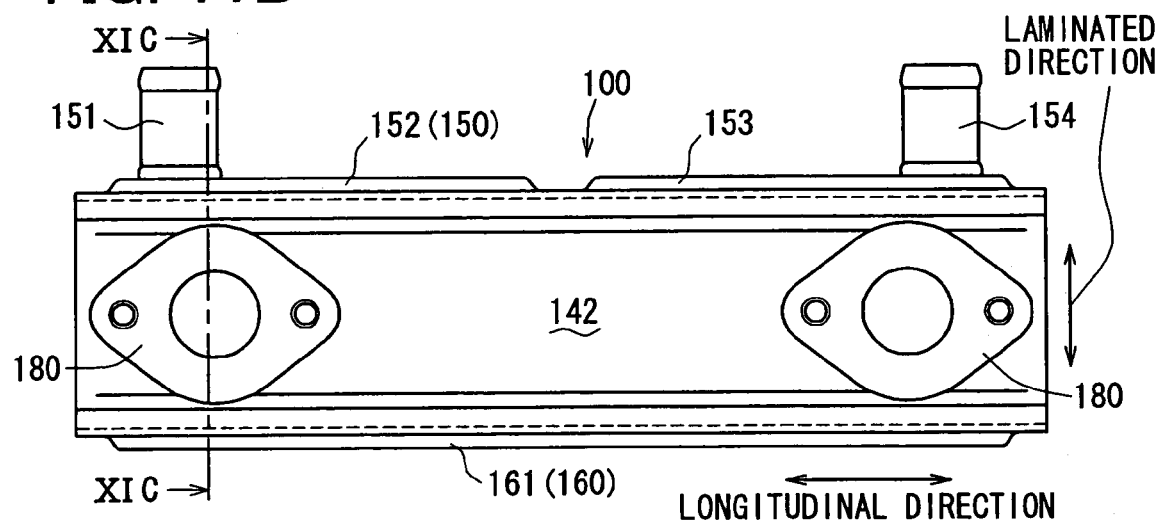
FIG. 11B is a side view of the exhaust gas heat exchanger 100 according to the second embodiment.
Figure 11C:
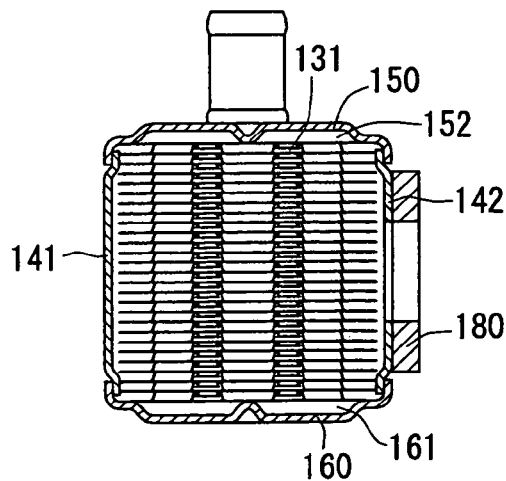
FIG. 11C is a cross sectional view taken along a line XIC-XIC in FIG. 11B.
Figure 11D:
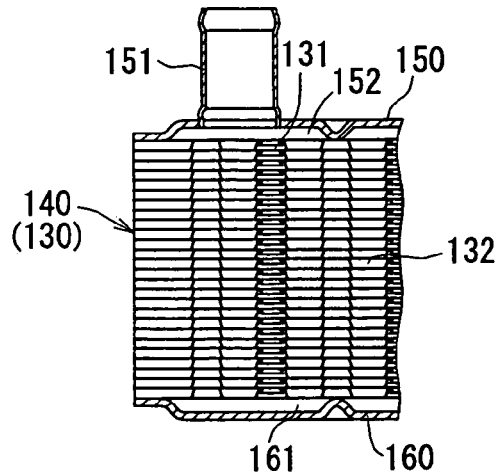
FIG. 11D is a cross sectional view taken along a line XID-XID in FIG. 11A.

FIGS. 11A to 11D show the exhaust gas heat exchanger 100 according to a second embodiment of the present invention, wherein FIG. 11A is a top plan view, FIG. 11B is a side view, FIG. 11C is a cross sectional view taken along a line XIC-XIC in FIG. 11B, and FIG. 11D is a cross sectional view taken along a line XID-XID in FIG. 11A. Each of the flat tubes 130 forming the heat exchange core 140 is made of a pair of tube plates 110 and 120, as in the same manner to the first embodiment. The tube plate 110 is fixed to the other tube plate 120 in such a manner that the burring portions 111 formed in the first tube plate 110 are inserted into the respective openings formed in the convex projections 121 of the second tube plate 120, and the forward end of the respective burring portions 111 are bent outwardly (caulked by enlarging the forward end).

According to the first embodiment, the exhaust gas passages 132 are formed by bending peripheral portions of the tube plate 120 at both ends of the width direction and those bent portions are brought into contact with the tube plate 110, so that the exhaust gas passages 132 are formed in the longitudinal direction. On the other hand, according to the second embodiment, the bent portions at both ends of the width direction are eliminated from the tube plate 120, but instead the exhaust gas passages 132 are formed by bending peripheral portions of the tube plate 120 at both ends of the longitudinal direction, so that the exhaust gas passages 132 are formed in the heat exchange core 140 in the longitudinal direction.

The coolant flow passages 131 are separated from the exhaust gas passages 132, by laminating and connecting the tubes 130 with each other, in which the burring portions 111 are inserted into the respective openings of the convex projections 121.

The side portions of the heat exchange core 140 in the width direction are covered with side plates 141 and 142, except for the exhaust gas inlet and outlet ports. Accordingly, the exhaust gas flows into the heat exchanger and flows through the heat exchange core 140 in the direction perpendicular to the direction of the coolant flow.

As above, the side portions of the heat exchange core 140 (the exhaust gas passages 132) are opened in the width direction, and the side plates 141, 142 are provided at such side portions, which are in the width direction perpendicular to the laminated direction and the longitudinal direction.

In the flat tube configuration, in which it is formed that the exhaust gas flows in the longitudinal direction, there is no flexibility for the directions of the exhaust gas flow. The flanges 180 are provided at both longitudinal ends of the heat exchange core 140, in which the exhaust gas flows in the longitudinal direction, in order that the longitudinal ends are connected with the exhaust pipe 11. The configuration of the flanges 180 is bound by the configuration of the heat exchange core 140. As a consequence, it may become necessary to provide additional parts and/or space for fitting the configuration of the flanges 180 in the configuration of the heat exchange core 140.

According to the second embodiment, however, the bent portions (wall portions) at both ends of the width direction are eliminated from the flat tube 130, the exhaust gas passages 132 are opened in the width direction, which is perpendicular to the laminated direction and the longitudinal direction. Instead, the longitudinal ends of the heat exchange core 140 are closed by wall portions formed in the flat tubes 130.

The side plates 141, 142 are provided at such side portions, which are in the width direction perpendicular to the laminated direction and the longitudinal direction of the heat exchange core 140, wherein the inlet and outlet ports (180) for the exhaust gas are provided at the side plate 142. With such a structure of the heat exchanger 100, more flexibility can be obtained for designing the inlet and outlet ports of the exhaust gas in the side plate 142 (the side portion of the heat exchange core 140 in the width direction).

The configuration and/or location of the inlet and outlet ports of the exhaust gas are not bound by the configuration of the heat exchange core 140. Therefore, the inlet and outlet ports of the exhaust gas can be freely designed, so that the heat exchanger 100 can be connected with the exhaust pipe 11 in the most appropriate manner. In FIG. 11, the inlet and outlet ports of the exhaust gas are provided on one side portion (the side plate 142) of the exhaust gas heat exchanger 100. However, the inlet and outlet ports may be provided on the both side portions (the side plates 141, 142) of the exhaust gas heat exchanger 100. Furthermore, the inlet and outlet ports may be respectively provided on one of the side portions (the side plates 141, 142) and one of the longitudinal ends of the exhaust gas heat exchanger 100.

Third Embodiment

Figure 12:
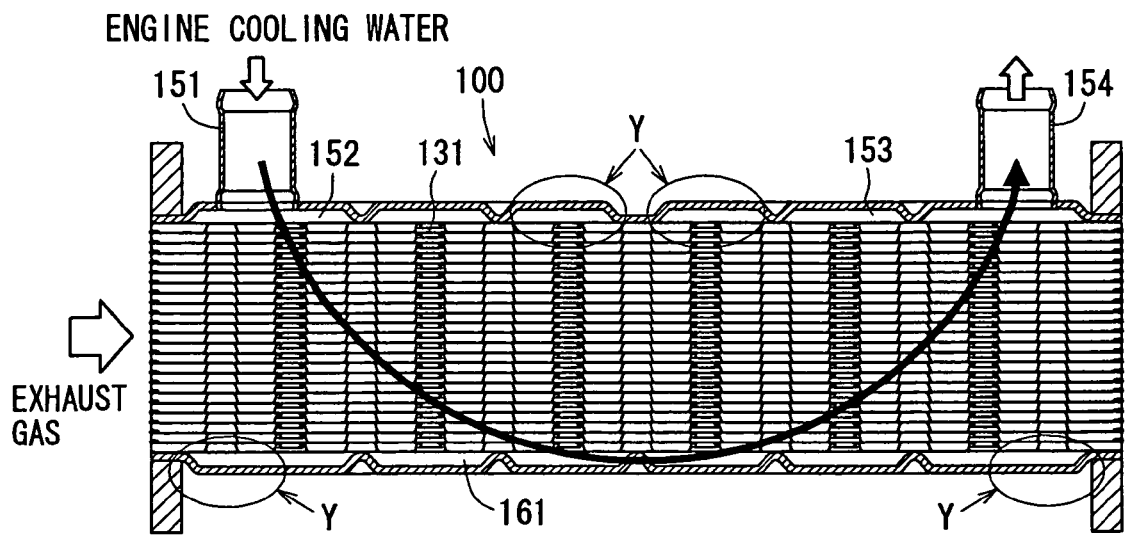
FIG. 12 is a cross sectional view of an exhaust gas heat exchanger 100 according to a third embodiment of the present invention.

FIG. 12 shows a cross sectional view of an exhaust gas heat exchanger 100. In the drawing, such portions Y are indicated, in which stagnation of the cooling water is likely to occur. As shown in FIG. 12, in the case that the heat exchanger 100 is designed such that the cooling water flows through the heat exchanger 100 in a U-shaped flow pattern, the stagnation of the cooling water may occur at such portions designated by "y", which are remote from the main flow (indicated by an arrow of a heavy line) of the cooling water. The cooling water thus stagnated may be boiled in the tank portions 152, 153 and 161 at such surface portions, which are in contact with the exhaust gas passages 132.

Figure 13A:
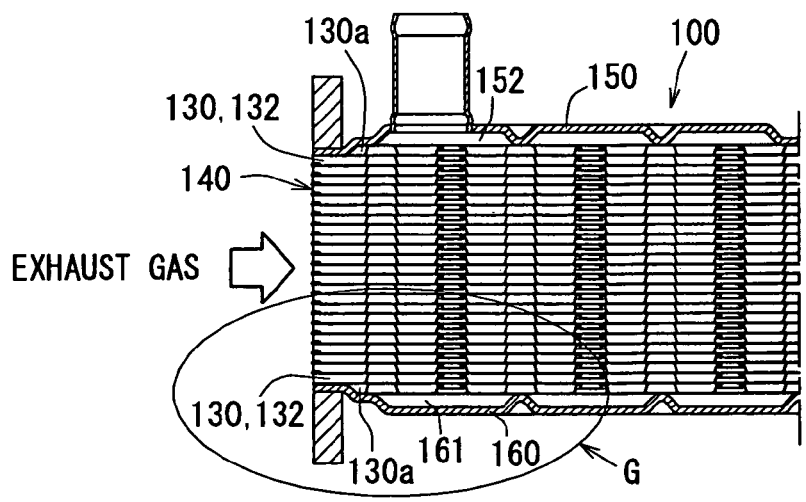
FIG. 13A is a cross sectional view of a left-hand half portion of the exhaust gas heat exchanger 100 according to the third embodiment.
Figure 13B:
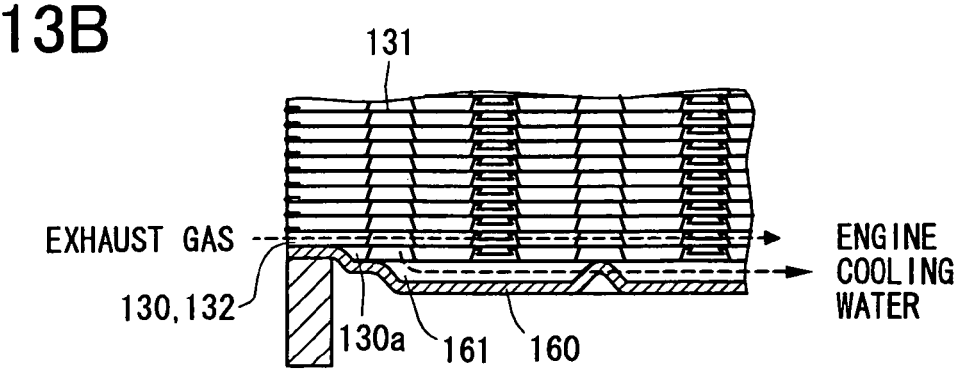
FIG. 13B is an enlarged view of a portion G of FIG. 13A.

FIG. 13A shows a cross sectional view of a left-hand half portion of the exhaust gas heat exchanger 100 according to the third embodiment, whereas FIG. 13B is an enlarged view of a portion G in FIG. 13A. In the heat exchanger 100, the tank portions 152, 153 and 161 are provided on the top and bottom sides of the heat exchange core 140 for distributing the cooling water into and collecting the cooling water from the coolant flow passages 131. According to the embodiment, air layers (heat insulating layers) 130a are provided between the exhaust gas passages 132 and the tank portions 152, 153 and 161, in order that the cooling water is prevented from boiling in the tank portions 152, 153 and 161, even if the cooling water flow may be stagnated.

More specifically, length of the flat tubes 130a at the uppermost and lowermost portion of the heat exchange core 140 is made to be shorter than that of the other flat tubes 130, wherein the flat tubes 130a are in contact with the tank portions 152, 153 and 161. Both of the longitudinal ends of the flat tubes 130a are closed, so that the exhaust gas may not flow through the flat tubes 130a, but instead the air layers (the heat insulating layers) are formed by the flat tubes 130a.

As above, in the third embodiment, the air layers 130a are formed between the exhaust gas passages 132 and the tank portions 152, 153 and 161. The cooling water is prevented from boiling by the air layers 130a, even when the cooling water flow may be stagnated in the tank portions 152, 153 and 161.

Although the shape of the flat tubes 130a and the tank plates 150, 160 are slightly different from the first embodiment, the basic lamination structure of the heat exchanger according to the third embodiment is almost identical to that of the first embodiment. Accordingly, the possible cost increase can be suppressed.

Fourth Embodiment

Figure 14A:
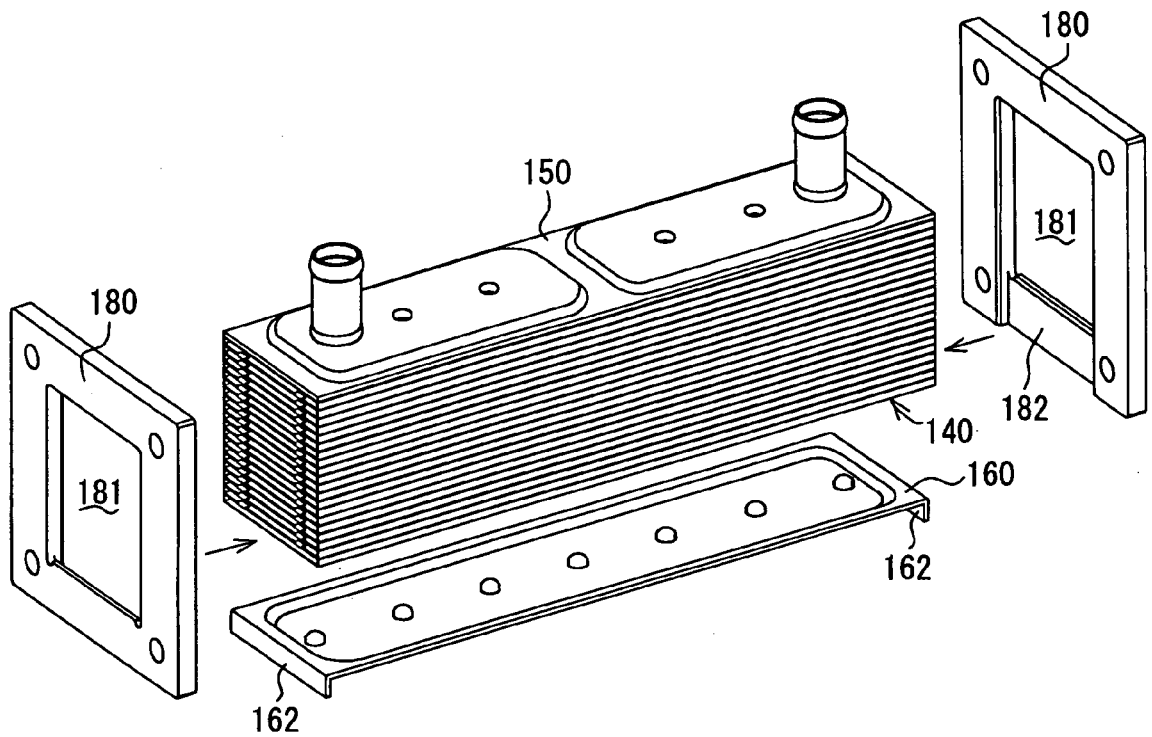
FIGS. 14A and 14B are oblique views of an exhaust gas heat exchanger 100 before and after assembling, according to a second embodiment of the present invention.
Figure 14B:
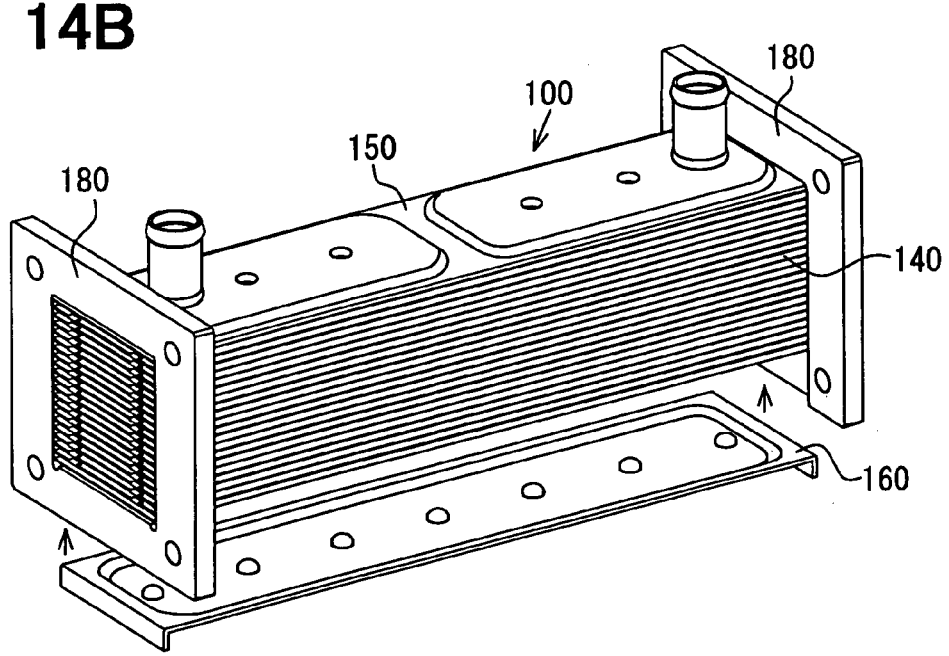
Figure 16:
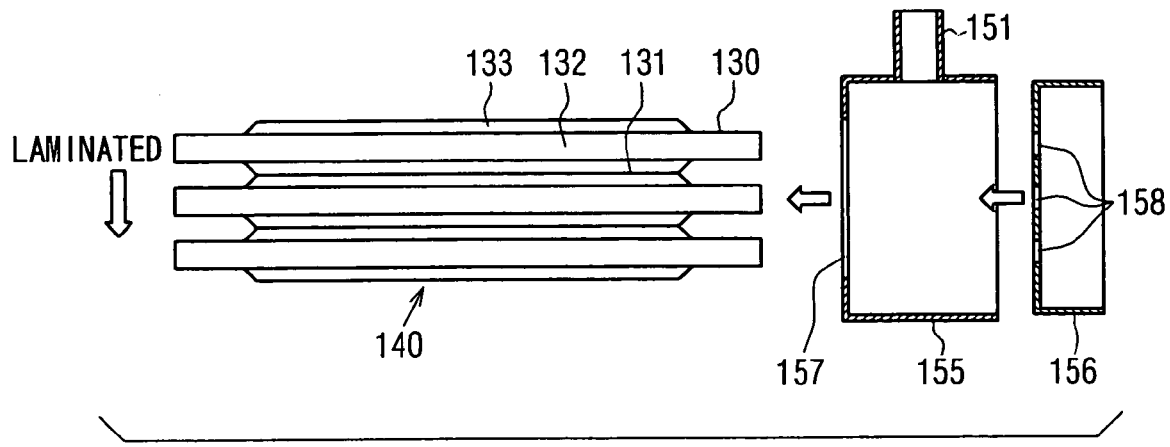
FIG. 16 is a schematic vertical cross sectional view showing an assembly configuration of a conventional exhaust gas heat exchanger.
Figure 17:
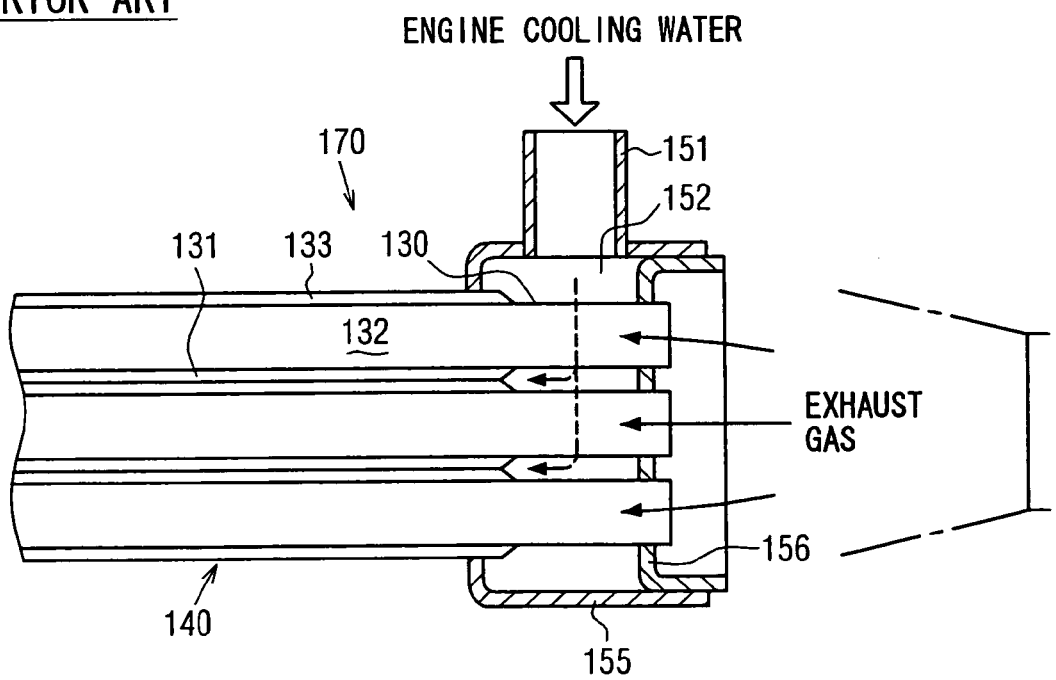
FIG. 17 is a partial cross sectional view for explaining a flow-path configuration of the exhaust gas heat exchanger of FIG. 16.

FIGS. 14A and 14B are oblique views of an exhaust gas heat exchanger 100 according to a fourth embodiment of the present invention, wherein FIG. 14A shows a state before assembling flanges 180, and FIG. 14B shows a state before assembling a lower tank plate 160. The fourth embodiment is different from the first embodiment in that at least one of the tank plates 150 and 160 is provided with slide plate portions 162 at both longitudinal ends thereof. The slide plate portions 162 face to and are in contact with the inside surfaces 182 of the flanges 180, and slide freely in the laminated direction of the heat exchange core 140, before being brazed.

FIGS. 15A to 15D are vertical cross sectional views respectively before and after brazing, wherein FIGS. 15A and 15B show the heat exchanger having no slide plate portions, whereas FIGS. 15C and 15D show the heat exchanger having slide plate portions. The thickness of the heat exchange core 140 is inclined to slightly shrink at brazing process due to melting spread of the brazing material of the tube plates 110, 120 and the tank plates 150, 160. Accordingly, in case that the heat exchange core 140 is simply inserted into the core-support openings 181 of the flanges 180, there is a possibility of leakage of exhaust gas through gaps which could be made between the heat exchange core 140 and the core-support openings 181.

In case of adopting the slide plate portions 162, however, leakage of exhaust gas can be prevented with the slide plate portions 162, which help cover the gaps that might be made between the heat exchange core 140 and the core-support openings 181 in accordance with shrinkage of the heat exchange core 140.

Other Embodiments

The above embodiments of the present invention are based on the coolant flow passes and the exhaust gas flow of U-turn flow design. It is understood, however, that the present invention is not limited thereto and that it can be practiced in various alternative embodiments, such as one-way flow pass from one side to the other side, or flow passes of plural flow turns exceeding the U-turn flow (e.g. N-turn, W-turn). Furthermore, the number of the coolant flow passages 131 can be altered in the respective flow passes, depending on temperature gradient of exhaust gas.

In the above embodiments of the present invention, the laminated flat tubes 130 are pre-assembled and the laminated structure of the tubes is held by the caulking hooks 112 for preventing possible displacement of the laminated flat tubes 130. It is also possible, instead of the caulking hooks 112, to have peripheral portions of the coolant flow pass holes 131a of the flat tubes 130 suitably shaped so as to fit in upside down at the time of lamination.

In the above embodiments, the exhaust gas heat exchanger 100 of the present invention is arranged inside the muffler 11. It is also possible to apply the exhaust gas heat exchanger 100 of the present invention to an EGR gas cooler (not shown), which is provided in an exhaust gas re-circulating passage for re-circulating a part of exhaust gas of the engine 10 to an air intake side of the engine 10.

In the above embodiments, the heat exchanger is so constructed that only the exhaust gas flows in the spaces defined between the pair of tube plates 110, 120. However, the heat exchanger can be also constructed such that a space is defined by the pair of tube plates for the exhaust gas, whereas another space is formed between the neighboring tubes 130 for the liquid coolant and both longitudinal ends of the space for the liquid coolant are closed.

What is claimed is:

1. An exhaust gas heat exchanger for a liquid cooled internal combustion engine, in which heat exchange between exhaust gas and liquid coolant is performed, the exhaust gas heat exchanger comprising:

a heat exchange core having a plurality of flat tubes laminated in a thickness direction, each flat tube defining an exhaust gas passage in which the exhaust gas flows; and a plurality of coolant flow pass holes formed in each of the flat tubes, each of the coolant flow pass holes penetrating the flat tube in the thickness direction, wherein the plurality of the flat tubes are laminated in the thickness direction in such a manner that no space is left between adjacent flat tubes, wherein the coolant flow pass holes of each flat tube are connected with the coolant flow pass holes of the other flat tubes, in order to respectively form a plurality of coolant flow passages through which liquid coolant flows, wherein the coolant flow pass holes of each of the coolant flow passages communicate with each other in the thickness direction, so that the coolant flow passages are formed to be perpendicular to the exhaust gas passages, and wherein the exhaust gas heat exchanger further comprises:

a first tank plate laminated on a top end of the heat exchange core in a laminated direction of the flat tubes to form an inlet side tank portion in communication with one end of a first group of the coolant flow passages so as to distribute the liquid coolant into the first group of the coolant flow passages, and to form an outlet side tank portion in communication with one end of a second group of the coolant flow passages so as to collect the liquid coolant from the second group of the coolant flow passages, and, a second tank plate laminated on a bottom end of the heat exchange core in the laminated direction to form a distributing tank portion in communication with other ends of the first and second groups of the coolant flow passages so as to collect the liquid coolant from the first group of the coolant flow passages and to distribute the collected coolant into the second group of the coolant flow passages.

2. An exhaust gas heat exchanger according to claim 1, wherein each of the flat tubes is formed by a pair of first and second tube plates, a plurality of holes are formed in the first tube plate, and a plurality of convex portions are formed in the second tube plate, each of the convex portions having an opening at a top surface thereof, and the hole of the first tube plate and the opening of the second tube plate are connected with each other, when the first and second tube plates are laminated, to form the coolant flow pass hole.

3. An exhaust gas heat exchanger according to claim 2, wherein multiple fins are formed on one of the tube plates.

4. An exhaust gas heat exchanger according to claim 3, wherein each of the multiple fins are formed into a triangular shape.

5. An exhaust gas heat exchanger according to claim 1, wherein the coolant flow passages are arranged in a zigzag layout with respect to the exhaust gas passages.

6. An exhaust gas heat exchanger according to claim 1, wherein the exhaust gas passages are opened in the width direction of the flat tubes, and side plates are provided at such side portions of the heat exchange core, which are in the width direction perpendicular to the laminated direction and the longitudinal direction of the heat exchange core.

7. An exhaust gas heat exchanger according to claim 1, wherein air layers are formed between the exhaust gas passages and the tank portions.

8. An exhaust gas heat exchanger according to claim 1, wherein at least one of the tube plates for the flat tubes, the tank plates and side plates is made of metal sheets clad with brazing material on its one surface or on both surfaces.

9. An exhaust gas heat exchanger according to claim 1, wherein both ends of the exhaust gas passages formed in the heat exchange core are inserted into respective core-support openings of a pair of flanges, so that outer peripheral portions of the both ends are brazed to the flanges, and slide plate portions are provided at longitudinal ends of one of the tank plates, wherein the slide plate portions face to and are in contact with inside surfaces of the flanges and the slide plate portions are movable in the laminated direction before the tank plates are brazed to the heat exchange core.

10. An exhaust gas heat exchanger provided in an exhaust pipe of a liquid-cooled engine, in which heat exchange between exhaust gas and liquid coolant is performed, the exhaust gas heat exchanger comprising:

a first tube plate having a first group of communication holes;

a second tube plate having a second group of communication holes, wherein a pair of the first and second tube plates is fixed to each other to form a flat tube and an exhaust gas passage in the flat tube, and wherein a plurality of the flat tubes are laminated in a thickness direction thereof in such a manner that no space is left between adjacent flat tubes, wherein the first and second groups of the communication holes communicate with each other, when the respective pairs of the first and second tube plates are fixed to each other, to form coolant flow passages in the thickness direction, the coolant flow passages being separated from the exhaust gas passages, and the coolant flow passages being formed to be perpendicular to the exhaust gas passages;

a heat exchange core formed by the first and second tube plates, wherein the exhaust gas passages are opened at both longitudinal ends thereof; and a pair of flanges having core-support openings, into which both longitudinal ends of the heat exchange core are inserted and outer peripheral portions of the both ends are brazed to the flanges, and wherein the exhaust gas heat exchanger further comprises:

a first tank plate laminated on a top end of the heat exchange core in a laminated direction of the flat tubes, to form an inlet side tank portion in communication with one end of a first group of the coolant flow passages so as to distribute the liquid coolant into the first group of the coolant flow passages, and to form an outlet side tank portion in communication with one end of a second group of the coolant flow passages so as to collect the liquid coolant from the second group of the coolant flow passages; and a second tank plate laminated on a bottom end of the heat exchange core in the laminated direction to form a distributing tank portion in communication with other ends of the first and second groups of the coolant flow passages to collect the liquid coolant from the first group of the coolant flow passages and to distribute the collected coolant into the second group of the coolant flow passages.

11. The exhaust gas heat exchanger according to claim 10, wherein the distributing tank portion collects all of the liquid coolant from the first group of the coolant flow passages.

12. The exhaust gas heat exchanger according to claim 1, wherein the distributing tank portion collects all of the liquid coolant from the first group of the coolant flow passages.

* * * * *